United States Patent [19]
Riebe

[11] Patent Number: 5,709,288
[45] Date of Patent: Jan. 20, 1998

[54] CLAMSHELL CUP FRICTION ARTICLE AND METHOD

[75] Inventor: Gary Charles Riebe, Tipp City, Ohio

[73] Assignee: The B.F. Goodrich Company, Akron, Ohio

[21] Appl. No.: 715,704

[22] Filed: Sep. 19, 1996

[51] Int. Cl.⁶ .................................................. F16D 65/12
[52] U.S. Cl. ........................... 188/218 XL; 188/73.32; 188/25 OD
[58] Field of Search ........................... 188/218 XL, 17, 188/18 R, 18 A, 71.7, 73.1, 73.2, 73.31, 73.32, 73.39, 71.5, 25 OD

[56] References Cited

U.S. PATENT DOCUMENTS

| | | | |
|---|---|---|---|
| 3,913,716 | 10/1975 | Sedlock | 188/218 XL |
| 3,920,108 | 11/1975 | Ely | 188/218 XL |
| 4,019,613 | 4/1977 | Harrison | 188/218 XL |
| 4,350,231 | 9/1982 | Crossman et al. | 188/218 XL |
| 5,558,186 | 9/1996 | Hyde et al. | 188/218 XL |

Primary Examiner—Josie Ballato
Attorney, Agent, or Firm—David M. Ronyak

[57] ABSTRACT

A friction disk assembly comprises an annular structural carrier including a plurality of recessed and/or raised regions and torque drive notches spaced around its circumferential direction, and a segmented friction lining mounted on the carrier. Each segment of the friction lining comprises a clamshell-shaped friction cup including a pair of cup members containing a puck of friction material, each pair of cup members being joined by a deformable strap and together defining a U-shaped configuration. The obverse side of each cup member includes projections and/or depressed areas that are complementary in size, shape and location to the recessed and/or raised regions of the associated carrier operatively engaged therewith to prevent movement of the lining relative to the carrier during a braking event. The carrier may be formed of steel or other suitable structural material. The lining may be formed of suitable friction material, e.g. sintered metal. The lining may be retained to the carrier by rivets that pass through lugs extending from the cup members. The friction pucks are provided with a structural casing configured to engage the recessed and/or raised regions of the carrier. The assembly may be refurbished by simple replacement of the worn lining together with its associated structural casing.

29 Claims, 7 Drawing Sheets

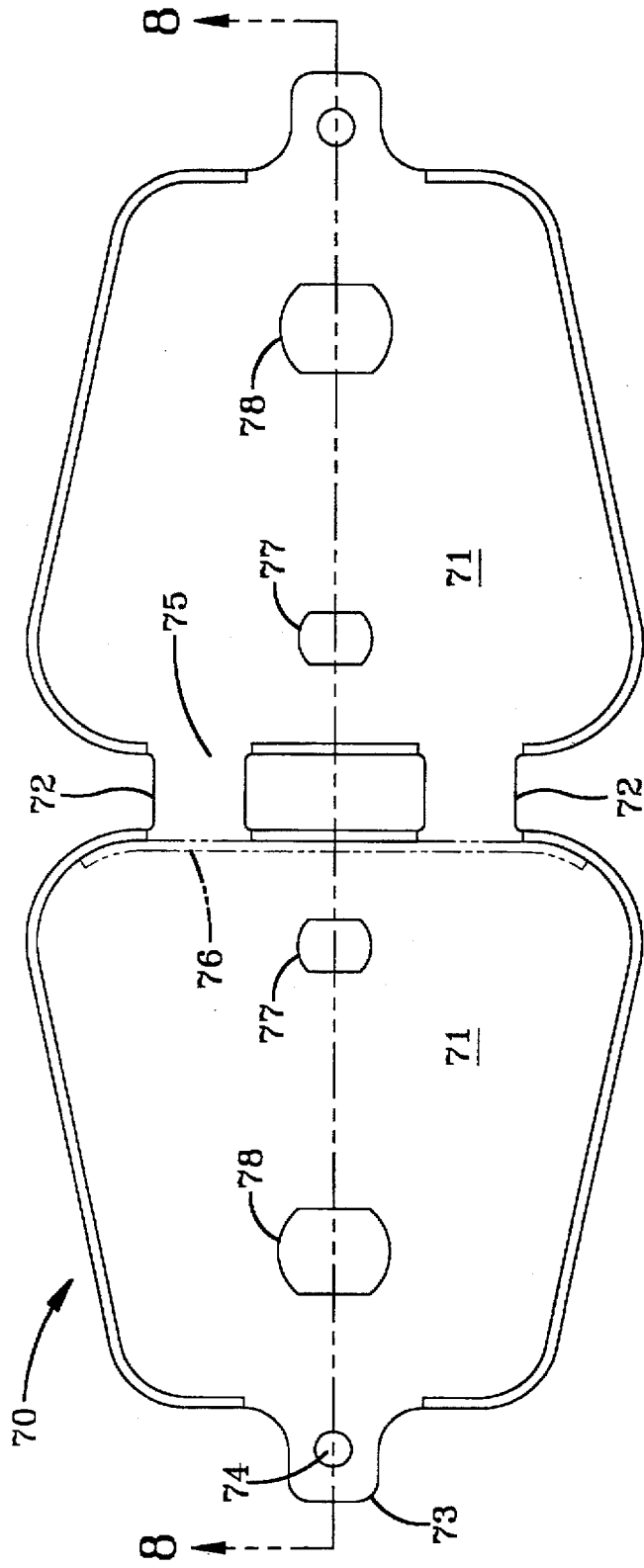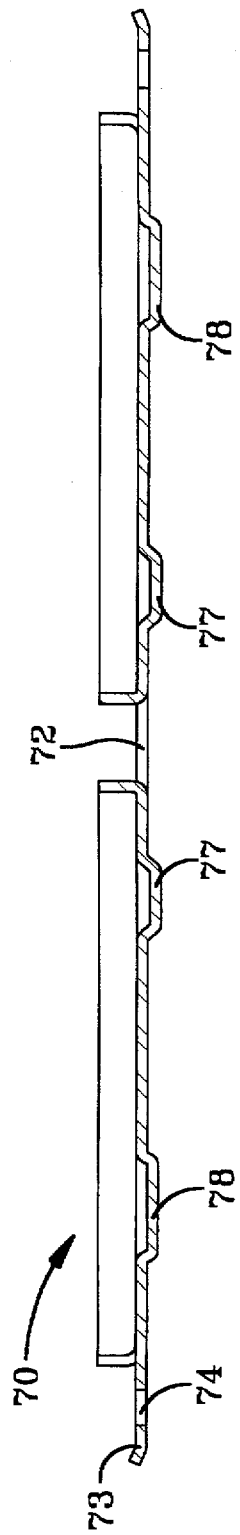

CLAMSHELL CUP FRICTION ARTICLE AND METHOD

BACKGROUND OF THE INVENTION

This invention relates to friction coupling devices, particularly of the type having axially aligned alternating rotatable and stationary disks carried between and axially movable between a pressure plate and a reaction plate, and more particularly to an improved friction disk for use in such an assembly, suitable for use in the brake stack of an aircraft wheel and brake assembly, and to refurbishment of such improved disk.

Multi-disk brakes having disks replaceable wear pucks have come to be employed in many aircraft braking applications. Many different arrangements have been proposed to maximize utilization of the individual friction disk members and reduce their costs of manufacture and refurbishment. Such prior art efforts include welding or riveting a plurality of cup-shaped steel supports that are filled with friction material to a core disk (U.S. Pat. No. 2,784,105 to Stedman et al.), riveting carbon wear facings to a core disk formed of beryllium segments (U.S. Pat. No. 3,731,769 to Ely), and forming friction disk by encapsulating a plurality of beryllium segments within a hollow structural annular steel retainer and providing the outer surfaces of the retainer with suitable friction lining (U.S. Pat. No. 3,376,960 to Bender). Notwithstanding the foregoing efforts, there remains a desire to enhance friction material utilization and further reduce the time and cost of manufacture and refurbishment of such friction disks.

SUMMARY OF THIS INVENTION

The present invention provides a friction disk having a reusable structural carrier to which readily replaceable segmented wear elements are mechanically attached to the associated carrier, and a method for refurbishing such a friction disk. The carrier is an annular structural member having a plurality of circumferentially spaced apart recesses, slots or apertures. The replaceable wear elements include pucks of friction material secured to a clamshell-shaped holder. The obverse face of the clamshell-shaped member (obverse to the rubbing face of the pucks of friction material) includes raised or recessed areas of size and shape that are complementary to recessed or raised areas of the carrier. The raised or recessed areas of the lining holder matingly engage the walls of the recesses or raised areas of the carrier thereby locating the segmented lining and providing surfaces for transfer of torque during a braking action, thereby preventing movement of the lining relative to the carrier. The forces generated during a braking action are transmitted from the lining to the carrier through shear loading of these complementary raised or recessed areas. In these preferred embodiments, the braking forces are not transferred through the fasteners which retain the lining in position on the core. The carrier may be formed of metal, carbon or other suitable material capable of retaining sufficient structural properties at the temperatures to be encountered in service. The lining material may be formed from sintered metal or other suitable friction material for the intended service.

According to an aspect of the invention there is provided an improved friction disk comprising a structural core carrier to which are attached segmented friction linings, in which each friction lining member includes an easily replacable clamshell-shaped holder the cups of which are filled with friction material.

According to a further aspect of the invention, there is provided a method of refurbishing a worn friction disk comprising an annular carrier including a plurality U-shaped friction puck holders mounted thereon and spaced around its circumferential direction, the carrier including a plurality of recessed and/or raised regions and torque drive notches spaced around its circumferential direction, and a segmented friction lining mounted on the carrier, each segment of the friction lining including a U-shaped friction puck holder having a flat wear (rubbing) face on each side of the carrier and an obverse face including raised and/or depressed areas corresponding to and matingly engaging the recessed and/or raised regions of the carrier to provide torque transfer capability between the lining and the carrier, the method comprising removing and discarding the worn friction pucks together with their associated holders, positioning a plurality of new friction lining holders having new friction pucks on the carrier to provide a desired assembly thickness and securing the new friction lining holders in to place, the new friction lining having a flat wear face and an obverse face including raised and/or depressed areas corresponding to and matingly engaging the recessed and/or raised regions of the carrier to provide torque transfer capability between the lining and the carrier.

In comparison to conventional steel aircraft brakes, preferred embodiments of disk assemblies according to the invention are more easily and quickly refurbished with less risk of damage to the structural features which provide for transfer of torque during a braking action. These advantages are in measure due to there being fewer parts to handle during original assembly and refurbishment, the self-aligning feature of certain preferred embodiments, and placement of the fasteners that retain the lining to the carrier outside of the rubbing area.

For a more complete understanding of the invention and its advantages, reference should be had to the following detailed description and the accompanying drawings in which there is shown and described a preferred embodiment of the invention.

BRIEF DESCRIPTION OF THE DRAWINGS

FIG. 7 is a plan view of an embodiment of a friction lining holder according to the invention FIG. 8 is a sectional view taken along line 8—8 of FIG. 7.

DETAILED DESCRIPTION

Figure 1:
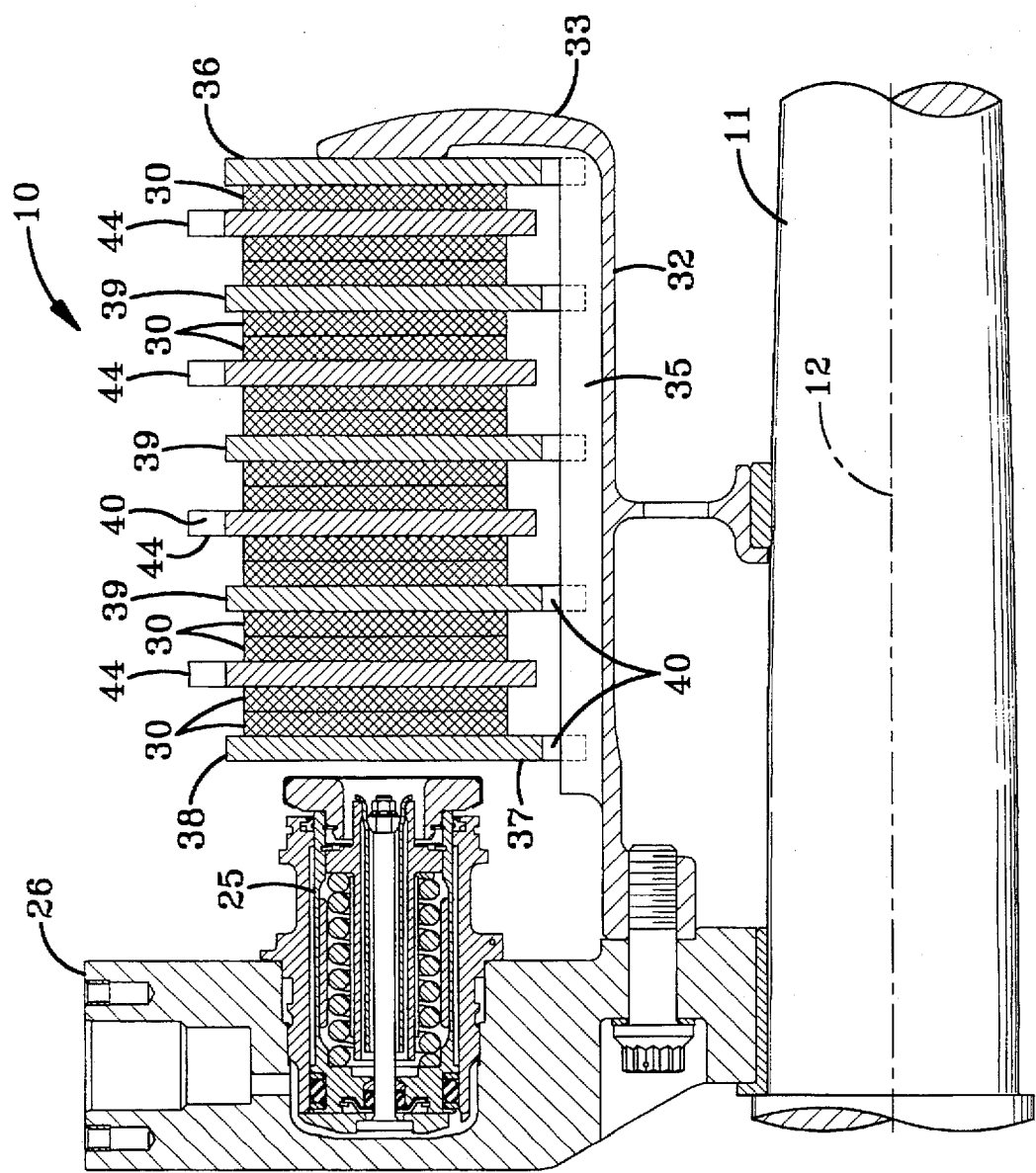
FIG. 1 is a schematic cross-sectional view of a multi-disk friction device in the form of an aircraft brake assembly.

Referring to the drawings, wherein like reference numerals designate like or corresponding parts throughout the several views, there is shown in FIG. 1 a friction brake mechanism 10 mounted on axle 11 for use with a generally cylindrical wheel (not illustrated) rotatable about axial centerline 12 in a manner fully described in U.S. Pat. No. 4,018,082 to Rastogi et al., U.S. Pat. No. 4,878,563 to Baden et al., and U.S. Pat. No. 5,248,013 to Hogue et al. The friction brake mechanism 10 includes a pressure plate 38 adjacent the hydraulic piston motors 25, an end plate 36 distal from the piston motors, and a plurality of interleaved rotor disks 44 and stator disks 39 which together form the brake heat sink or brake stack during a braking action. The rotor disks 44 are coupled through notches 40 on their outer periphery for rotation with the wheel relative to the axle and the stator disks 39 are coupled through notches 40 on their inner periphery against rotation relative to the axle. The friction brake mechanism 10 also includes a torque tube 32 to which the pressure plate 38, end plate 36 and stator disks 39 are slidably mounted against rotation relative to the wheel and rotor disks 44.

The torque tube 32 includes a reaction plate 33 which may be made integral with the torque tube 32 as shown in FIG. 1 or may be made as a separate annular piece and suitably connected to the stationary torque tube 32. Torque tube 32 has a plurality of circumferentially spaced, axially extending splines 35 that support an axially moveable nonrotatable pressure plate 38 and axially moveable nonrotatable stator disks 39. All of such stator disks 39 and pressure plate 38 have notches in the form of slotted openings 40 at circumferentially spaced locations on their inner periphery for captive engagement by the spline members 35 as is old and well known in the art. A end plate 36 is suitably supported against rotation against the flared end 33 of the torque tube 32 and acts in concert with the stator disks 39 and the pressure plate 38 to be further described herein. In certain preferred embodiments and as shown in FIG. 1, the end plate may be of identical construction to that of the pressure plate 38.

The respective annular stator disks 39 each have friction linings 30 secured to opposite faces thereof as shown in FIG. 1. Each of pressure plate 38 and end plate 36 has a friction lining 30 on one surface thereof to act in concert with the other friction linings 30 when a braking action occurs.

A plurality of axially spaced rotor disks 44 are interleaved between the pressure plate 38 and the stator disks 39 and have a plurality of circumferentially spaced notches 40 along their outer periphery for engagement by corresponding ribs secured to or integrally formed with the inner periphery of the wheel. The annular rotor disks 44 are each formed metal and may each be a single piece or formed of a plurality of segments, e.g. as described in U.S. Pat. No. 3,473,635 to Krause.

The number and size of the disks may be varied as is necessary for the application involved. The circumferentially spaced notches 40 on the inner periphery of the stator disk carriers 43 and on the outer periphery of the rotor disks 44 may be provided with reinforcing inserts to reinforce the walls of such slotted openings and to enhance the life of such slots.

The actuating mechanism for the brake is capable of effecting a braking action by moving the pressure plate 38 and the stator disks 39 into frictional engagement with the rotor disks 44 and end plate 36 against the reaction plate 33. The actuating mechanism may include a plurality of motors such as hydraulic piston assemblies 25 circumferentially spaced around the annular piston housing 26 in known manner. Only one piston assembly is shown in FIG. 1.

The pressure plate 38 has an annular friction lining 30 formed of segments of friction material attached to the surface of pressure plate 38 opposite to the face of the pressure plate carrier 37 that receives the head of the hydraulic piston motors 25. The carrier 37 of pressure plate 38 is coupled against rotation relative to the torque tube 32 via slotted openings 40 at circumferentially spaced locations on its inner periphery.

Figure 2:
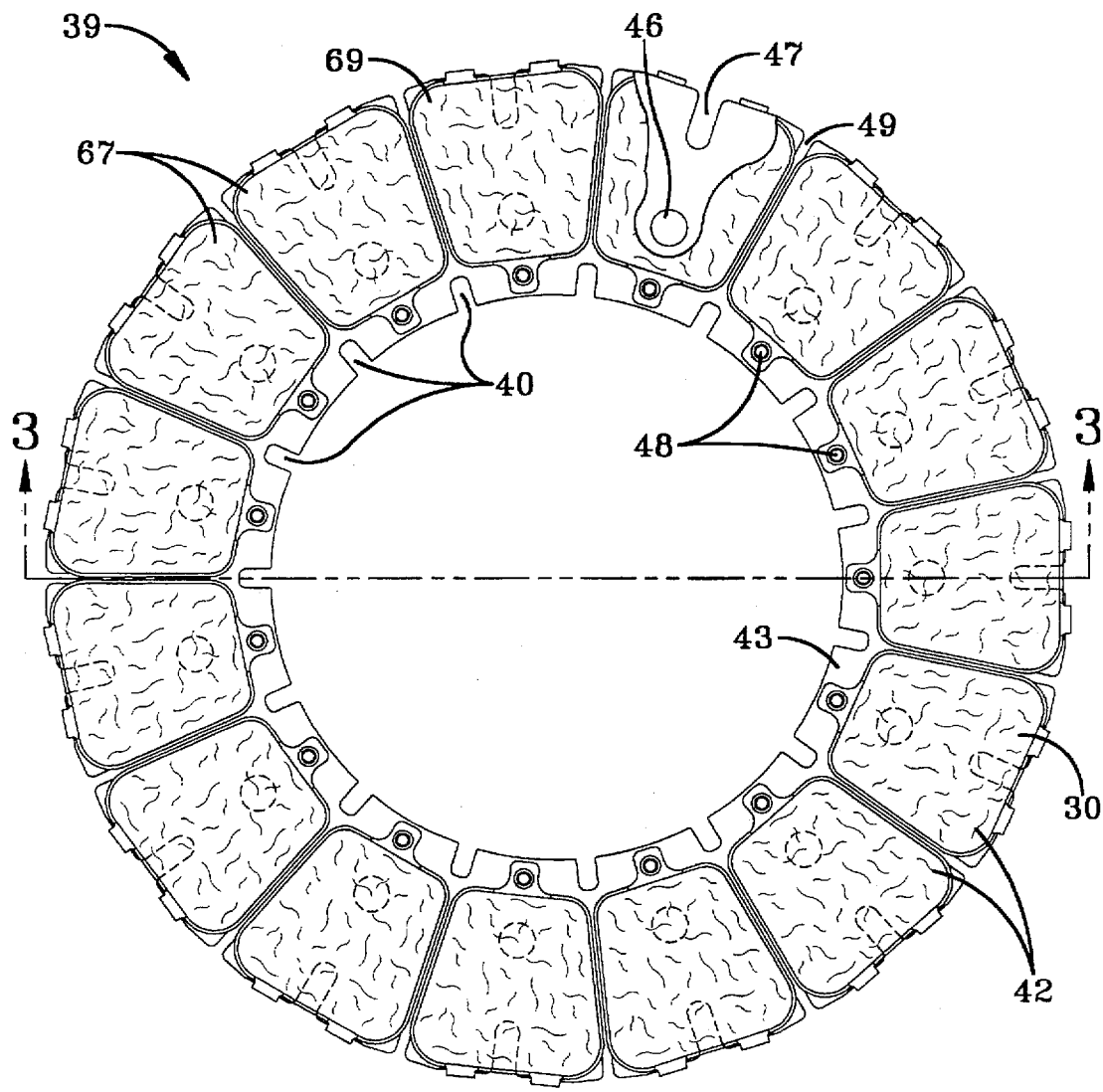
FIG. 2 is a plan view of a friction disk (stator) according to the invention.
Figure 3:
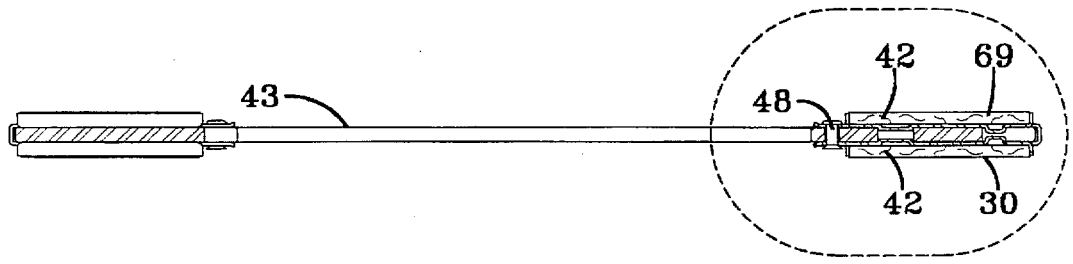
FIG. 3 is a sectional view taken along line 3—3 of FIG. 2.
Figure 4:
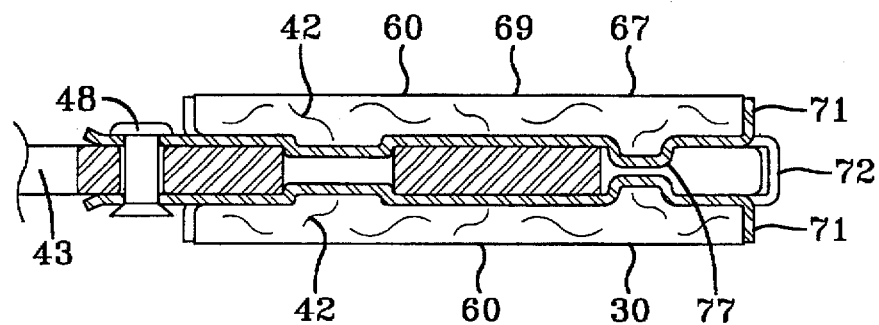
FIG. 4 is an enlarged sectional view of the region of FIG. 3 encircled with a dashed line.
Figure 5:
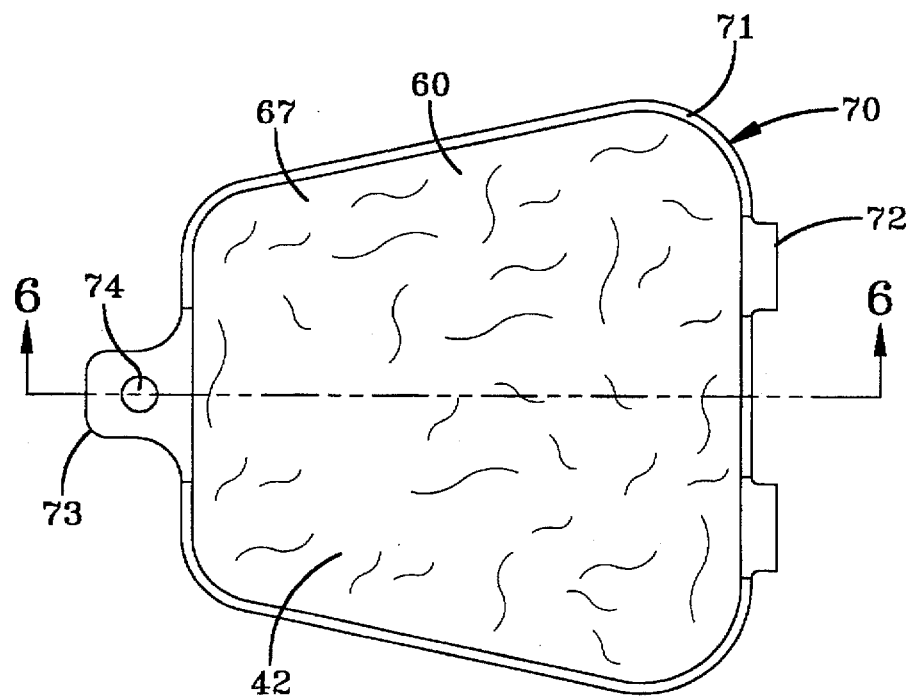
FIG. 5 is a plan view of an embodiment of a segmented lining member according to the invention.

Having reference to FIGS. 2 through 4, reference numeral 39 designates generally a friction disk (stator) according to an embodiment of the invention. Friction stator disk 39 includes an annular carrier 43 provided at spaced intervals on its inner periphery with a plurality of notches 40 that are adapted to be captively engaged by the spline members 35 on torque tube 32, and friction linings 30 secured to the carrier 43 by mechanical fasteners such as rivets 48.

Figure 9:
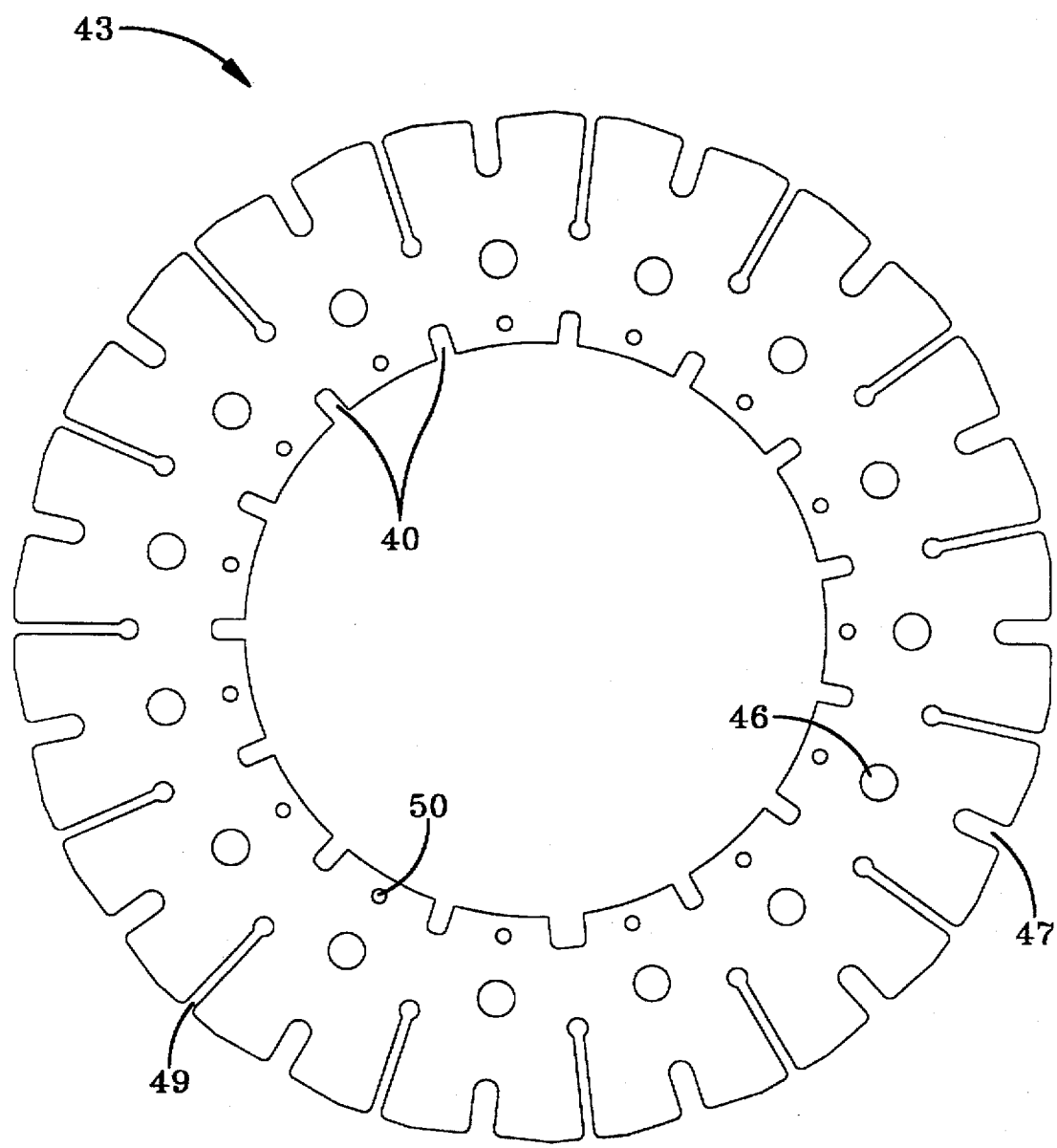
FIG. 9 is a plan view of a friction disk (stator) carrier according to the invention.

The carrier 43 of friction stator disk 39 is preferably formed of a material chosen for its structural properties, such as type 1722 steel available from The Timken Company, other metal or carbon composite. As best shown in FIGS. 2 and 9, the carrier 43 of a stator disk 39 includes a plurality of circumferentially spaced recesses, slots or apertures 46, 47 arranged in two radially spaced annular rows. In the particular embodiment shown in the Figures, the carrrier 43 includes a radially outermost row of slots 47 adapted to receive the smaller torque transfer buttons 77, (FIGS. 6, 7 and 8), projecting from the backs (obverse side) of the segmented friction lining holders 70, and a radially innermost row of apertures 46 adapted to receive the larger torque transfer buttons 78 projecting from the backs of the segmented friction lining to holders 70. The carrier 43 is preferably formed as a single unitary member, e.g. by cutting from a sheet or flat plate of material or by molding or casting. As shown in FIG. 9, the carrier 43 may be provided with slots 49 to reduce stresses due to thermal cycling. Alternatively, the carrier 43 may be formed of segments that are mechanically joined together, e.g. in the manner shown in any of U.S. Pat. No. 3,731,769 to Ely, U.S. Pat. No. 3,550,740 to LeBlanc et al. and U.S. Pat. No. 4,747,473 to Bok et al. Carriers for all rotor disks and stator disks may be cut or machined from flat plate of the chosen material.

Figure 6:
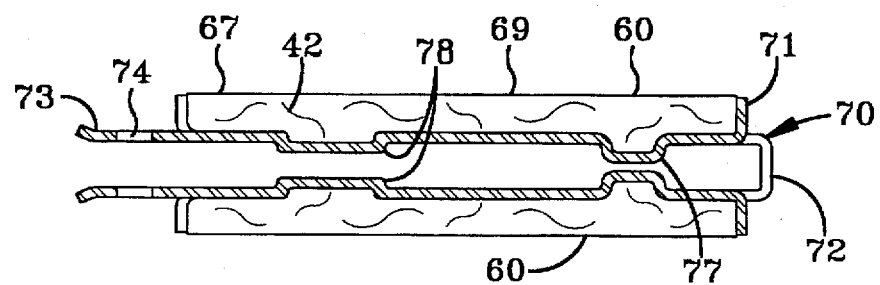
FIG. 6 is a sectional view taken along line 6—6 of FIG. 5.

The friction lining 30 may be formed of any suitable material chosen primarily for its frictional, wear resistance and heat capacity properties, and secondarily for its structural, corrosion and oxidation resistance properties. The friction lining is preferably formed of sintered metallic material but also may be formed of carbon, graphite, ceramic or other material. The friction lining is preferably in the form of individual pucks or sectors of an annular ring of a size generally corresponding to that of the carrier. In the preferred embodiment shown, each friction lining puck 42 has a flat trapezoidal-shaped wear face 60 adapted for rubbing engagment with the confronting wear face of a next adjacent friction disk, typically formed of a metal, e.g. type 1722 steel. The pucks 42 of friction material are contained in cup members 71 joined in pairs by one or more deformable straps 72 to provide a holder 70 having an overall configuration as shown in FIG. 6 that is similar to that of a fully opened clamshell. Holder 70 is preferably formed by stamping from a sheet of steel, e.g. type 4340 steel, and is preferably copper plated to inhibit corrosion and enhance bonding of the sintered metal pucks. The clamshell cup holder 70 is provided on its obverse face with projections that are configured to matingly engage with the complementary recessed regions of the associated carrier. In the preferred embodiment shown, the obverse face of each friction lining holder 70 has a plurality of raised areas such as buttons 77, 78 corresponding slots and shape to the recessed regions, slots or apertures 46, 47 of the carrier 43 with which the lining is designed to be used. The operative mating engagement of the periphery of the raised areas of the holder 70 with the recessed, slotted or aperture regions of the carrier 43 locates the position of the friction lining pucks 42 relative to the carrier 43 and provides a bearing surface for transfer of the shearing forces generated during braking action, thereby preventing movement of the friction lining puck 42 relative to the carrier 43. Buttons 77, 78 may be formed integrally with the bottom of the cups 71 by stamping, or by welding additional metal pieces onto the obverse face.

As shown in FIG. 7, when the holder 70 is formed as a single piece by stamping from a sheet of metal, the rim or wall of the cup 71 may be interrupted resulting in a gap 75 in the wall or rim of the cup 71 at its junction with the strap 72. This gap 75 may be filled with a dam or strip 76 of metal that is secured by welding to the cup. Dam 76 acts to inhibit molten metallic friction material from flowing out of gap 75 during a severe braking action.

As shown in FIGS. 2–8, each clamshell-shaped friction lining holder 70 includes a lug 73 extending laterally from the edge of the cup 71 opposite the strap 72. As best shown in FIG. 6, each lug 73 is preferably flared outwardly relative to the bottom of the cup 71 in a direction opposite to the direction in which the straps 72 are bent 180 degrees without being ruptured to form the holder 70 into a U-shaped clamshell shape. Flaring of the lugs 73 facilitates mounting of a clamshell-shaped friction pad holder 70 onto the structural carrier for which it is designed. Each lug 73 includes an aperture 74 extending therethrough adapted to receive a mechanical fastener such as a rivet 48 to secure the friction lining holder 70 to the carrrier 43. A suitable rivet 48 is preferably made of type 304 stainless steel. Alternatively, the lugs 73 of a friction lining holder may extend beyond the radially inner periphery 41 of the carrier 43 and be fastened or welded to each other.

In the preferred embodiment shown in FIGS. 3 and 4, in U-shaped friction lining holder 70 the ends of the cups 71 opposite their junction with the straps 72 are closer together than the ends of the cups 71 adjacent their junction with straps 72. This feature together with the flared ends of lugs 73 and projections 77, 78 facilitates mounting of friction holder 70 by sliding it onto its associated carrier disk 43. As the clamshell-shaped friction holder 70 is pushed onto the disk, the flared ends of lugs 73 are forced apart. The holder 70 springs back as the projections 77, 78 drop into operative engagement with their respective corresponding recesses 47, 46 of carrier 43. Because projections 78 are of a greater size than projections 77, they will not accidentally fit into recesses 47. Alternatively, projections 78 could also be of a different shape, or a pair of circumferentially spaced projections could be provided in place of projections 78 to achieve the same function. The net effect is that holder 70 can only be installed one way, the correct way, on its intended carrier 43.

Figure 12:
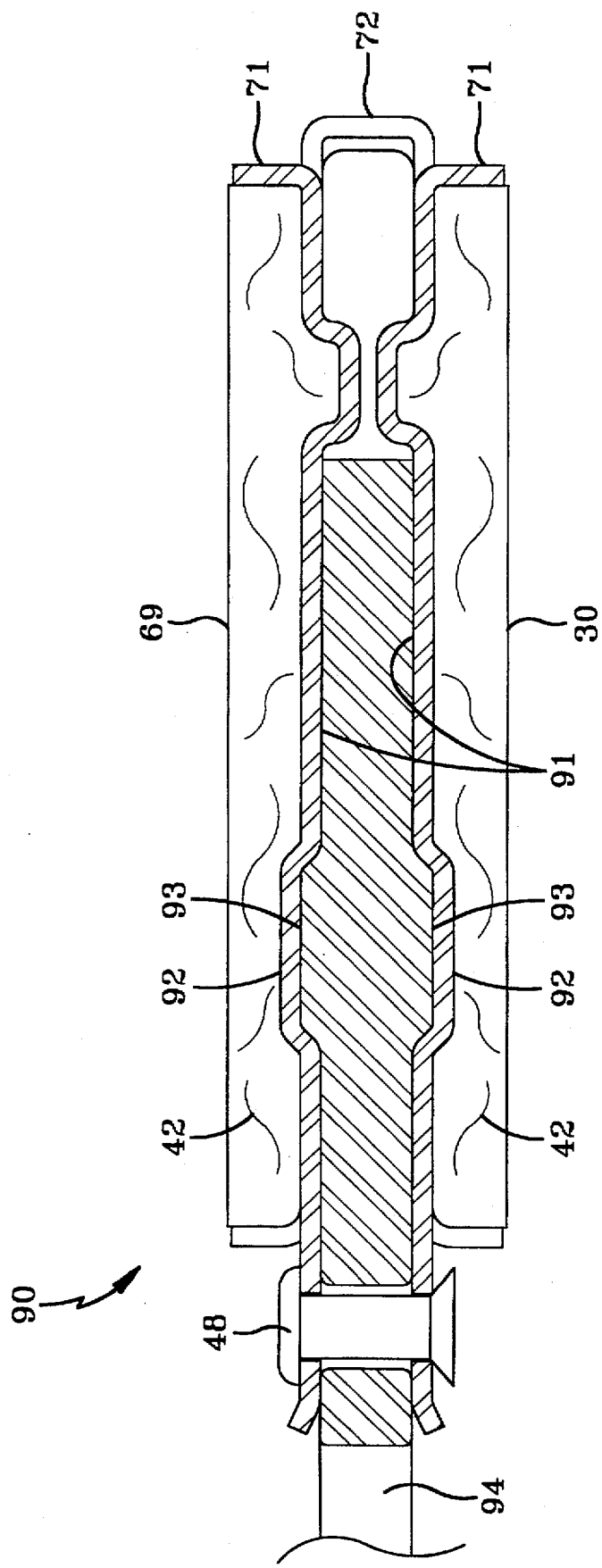
FIG. 12 is a sectional view of still another embodiment of a segmented lining member and a carrier according to the invention.

It should be understood that while a preferred embodiment has been described for transfer of the shearing loads that occur between the friction lining and its associated carrier, that alternatively, as shown in FIG. 12 the obverse face 91 of the holder 90 could include recesses 92 for mating engagement with complementary raised areas 93 or projections of the associated carrier 94, or a combination of recesses and projections could be provided on each of the complementary associated holder and carrier.

It should be understood that while the construction of a stator disk 39 is described in detail above, the principles of the invention may be likewise advantageously employed in the construction of a rotor disk. In the case of a rotor disk 44, the drive notches 40 of the carrier are formed on its outer circumference for engagment with the drive keys affixed to the rotatable member such as a aircraft wheel.

As shown in FIGS. 2–4 the friction lining 30 is formed of segments 67 of sintered metallic material 69 in holders 70, each being provided on its obverse face with a structural casing, e.g. of steel, that is configured to matingly engage with the recessed regions or apertures 46, 47 of the associated carrier 43 and to provide cups 71 which support the sintered metallic material. Use of holder 70 having a structural casing permits location of the means used to secure the holder onto the associated carrier, e.g. mechanical fasteners such as rivets 48 in the structural casing outside of the rubbing area of the wear faces, i.e. radially outwardly or radially inwardly of the wear faces, or in recessed regions between the circumferentially spaced segments 67 of sintered metallic material 69, providing the additional advantage of increased service wear before need of replacement.

Figure 10:
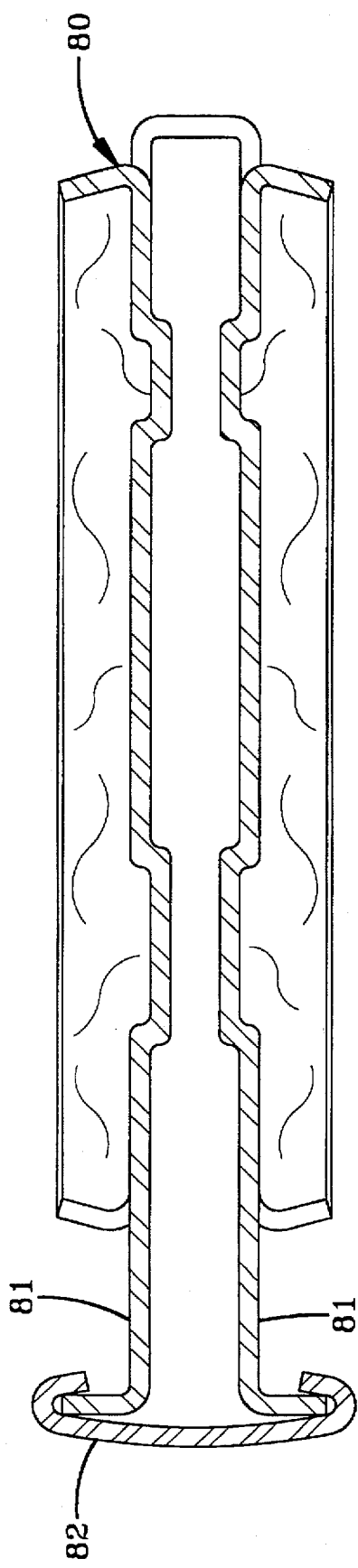
FIG. 10 is a sectional view of another embodiment of a segmented lining member according to the invention.
Figure 11:
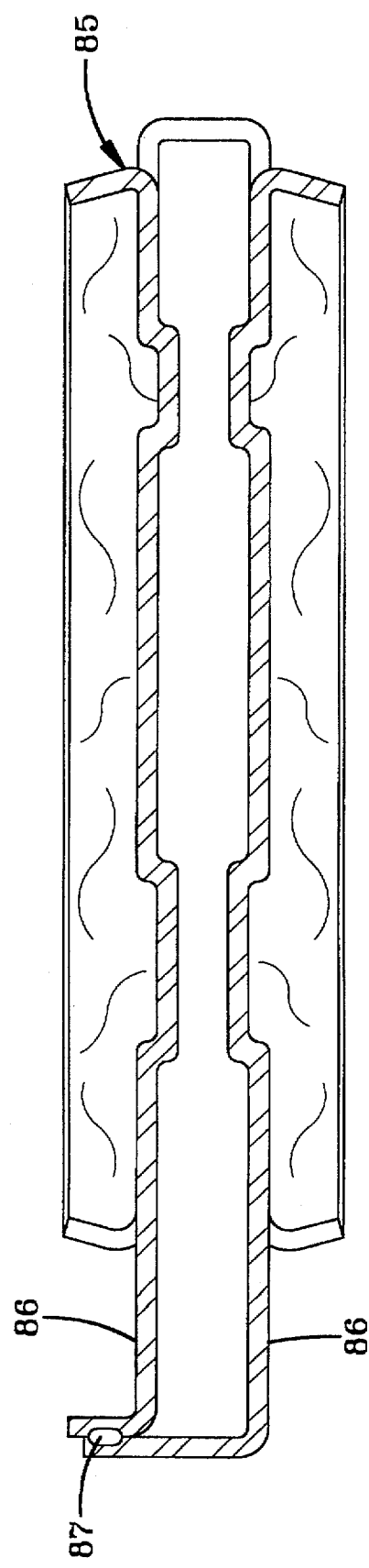
FIG. 11 is a sectional view of a further embodiment of a segmented lining member according to the invention.

Alternate means for attachment of the friction lining holders to the associated carrier are shown in FIGS. 10 and 11. As shown in FIG. 10, the lugs 81 of the cup holder 80 may be configured to extend radially inwardly beyond the inner periphery of the carrier and be secured to one another by a clip 82. As shown in FIG. 11, the lugs 86 of the cup holder 85 may be configured to extend radially inwardly beyond the inner periphery of the carrier and be secured to one another by weld 87.

The thickness of the carrier 43 at its drive notches 40 is comparable to those of conventional steel brakes to assure long life and the ability to be relined several times. The thickness of a steel carrier for a sintered metal/steel lined brake assembly suitable for use on a Boeing 737 aircraft is about 0.27 inches. The thickness of the friction lining pucks 42 for this same application when formed of sintered metal is about 0.22 inches, and the thickness of the structural casing 70 is about 0.06 inches.

The carrier may be formed of any suitable material chosen primarily for its structural properties, and secondarily for its heat capacity. The carrier may advantageously formed of metal such as steel, beryllium, titanium or Inconel, or of carbon and/or ceramic composite material designed for structural strength and resistance to corrosion and oxidation. Beryllium carriers may be provided with drive notch reinforcement of a different material such as steel to eliminate beryllium dust. When the carriers are formed of structural material such as type 1722 steel or the like, there is no need to utilize costly drive clips. The steel carrier may be plated to inhibit oxidative attack. To enhance retention of carrier structure during high energy input conditions such as may be encountered during a rejected take-off of an aircraft, the carrier(s) may be coated with a refractory thermal barrier material, e.g. ceramic material. Preferably, only those portions of the carrier(s) needing protection against excessive temperature during such an emergency energy input are coated. These areas may be determined empirically.

When the friction linings 30 of a friction device according to the invention have become sufficiently worn away and need to be replaced, it is merely necessary to remove the rivets 48, remove and discard the worn friction pucks 42 together with their associated holders 70, position a plurality of friction lining holders 70 having new friction pucks 42 on the carrier 43 and rivet the new friction lining holders into place. Because the fasteners do not bear the shearing loads encountered during a braking event, if there is any marring of apertures 50 of the carrier during removal or installation of the fasteners, such marring is not likely to require rejection of the carrier or disk. Because in preferred embodiments, the plurality of recessed and/or raised regions of the carrier and the plurality raised and/or depressed areas of the U-shaped friction puck holder together form a unique pattern, mating engagement of the complementary corresponding regions of the carrier and areas of the holder only is possible when the new friction puck holder is positioned correctly relative to the associated carrier.

It would be apparent that, although a specific embodiment of the invention has been described in detail, the invention is not limited to such specifically illustrated and described construction since variations may be made without departing from the principles of the invention.

What is claimed is:

1. A friction article comprising:
   a friction puck holder including a pair of cup members, each cup member having a bottom joined to a surrounding rim and configured to contain a puck of friction material and joined to the other cup member of the pair by a deformable strap extending from the junction of the edge of the bottom and the rim of the cup member such that the strap and the cup members together define a U-shaped configuration once deformed.

2. The article of claim 1 wherein each cup member includes a flat bottom surrounded by a rim projecting at an angle to the bottom.

3. The article of claim 2 wherein each cup member is provided with a lug portion extending laterally from the cup member opposite the strap.

4. The article of claim 3 wherein the lug portion is flared outwardly from the bottom of the cup member in a direction toward the rim.

5. The article of claim 1 wherein the outside of the bottoms of the cup members include at least one of recesses and projections for transfer of shearing loads.

6. The article of claim 1 further including two buttons projecting from the outside of the bottom of each cup member, the button distal the junction of the cup member with the strap being larger than the other button.

7. The article of claim 6 further including a flat annular carrier having a plurality of circumferentially spaced recesses operatively coupled to the friction puck holder to resist shearing loads imposed relative therebetween.

8. The article of claim 1 further including a puck of frictional material filling and fixedly secured to each cup member.

9. The article of claim 8 wherein the friction puck holder is formed into a U-shaped configuration prior to mounting.

10. The article of claim 9 wherein the outside of the bottom of each cup member includes a button projecting therefrom, the article further including a torque-transmitting ring-shaped carrier provided with a plurality of circumferentially spaced recesses that are configured to operatively receive the buttons.

11. The article of claim 10 further including a plurality of puck holders each having a first button and a second button projecting from the outside of the bottom of each cup member, the second button being more distal the junction of the cup member with the strap than the first button, wherein the carrier comprises a flat metal plate having a first set of circumferentially spaced apertures operatively engaged with said first buttons and defining a first circle and a second set of circumferentially spaced apertures operatively engaged with said second buttons and defining a second circle concentric with and smaller than the first circle.

12. The article of claim 11 wherein said second buttons and second set of apertures are of greater size than the first buttons and the first set of apertures.

13. The article of claim 11 wherein the second buttons are of a size and shape such that they will not fit into the first recesses.

14. The article of claim 13 wherein each cup member is provided with a lug portion extending laterally from the cup member in a direction opposite to the strap and by which the friction cup holder is fixedly secured relative to the carrier.

15. The article of claim 14 wherein each lug portion is provided with an aperture, the carrier is provided with an aperture in alignment with the apertures of the lug portions and a fastener passes through the aligned apertures and secures the friction puck holder relative to the carrier.

16. The article of claim 1 wherein the friction puck holder is formed of a single piece of metal.

17. The article of claim 16 wherein the rim of each cup member is interrupted at the junction of the cup member with the straps.

18. The article of claim 16 wherein the rim extends across the junction of each cup member with the strap.

19. The article of claim 1 wherein each cup member contains a puck of friction material, the puck holder is deformed into a U-shaped configuration, the article further including a ring-shaped torque-transmitting carrier, the outside of the bottom of each cup member and the carrier being provided with complementary recesses and projections operatively coupling the cups and carrier against shearing loads imposed relatively between them.

20. The device of claim 1 wherein each of the cups includes a flat bottom the outside of which has a first rounded projection proximal the junction with the strap and a second rounded projection distal the strap, the second projection being larger than the first.

21. The device of claim 20 wherein the strap is configured such that the cups and straps together are shaped like a clamshell that has been opened fully such that the outsides of the bottoms of the cups are confronting one another.

22. The device of claim 21 wherein the edges of the bottoms of the cups opposite the junctions with the strap are closer together than the edges of the bottoms of the cups adjacent the junctions with the strap.

23. The device of claim 22 wherein each cup is of trapezoidal shape with the base of the trapezoid being adjacent the junction with the strap.

24. The device of claim 23 wherein the edge of each cup distal the junction with the strap includes a lug for fastening the friction cup member to a structural carrier.

25. The device of claim 24 wherein the ends of the lugs are flared to facilitate mounting onto the carrier.

26. A friction device comprising a spaced apart pair of metallic cups having a bottom, each cup adapted to receive a puck of friction material, the pair of cups being joined together by a strap extending from the edge of the bottom of one cup of the pair to the edge of the bottom of the other cup of the pair, the strap capable of being bent 180 degrees without rupture.

27. A method of refurbishing a worn friction disk comprising an annular carrier including a plurality of recessed and/or raised regions and torque drive notches spaced around the circumferential direction of the carrier, and a segmented friction lining mounted on the carrier, each segment of the friction lining including a friction puck holder having a flat wear face on each side of the carrier and an obverse face including raised and/or depressed areas corresponding to and matingly engaging the recessed and/or raised regions of the carrier to provide torque transfer capability between the lining and the carrier, the method comprising removing and discarding the worn friction pucks together with their associated holders, positioning a plurality of new U-shaped friction puck holders having new friction pucks on the carrier to provide a desired assembly thickness and securing the new U-shaped friction puck holders in place, each U-shaped friction puck holder including a pair of cup members, each cup member of the pair having a bottom joined to a surrounding rim and containing a puck of friction material, each cup member of the pair joined to the other cup member of the pair by a strap extending from the junction of the bottom and the rim of the cup member such that the strap and the pair of cup members together define a U-shaped configuration, the new U-shaped friction puck holders having a flat wear face and an obverse face including raised and/or depressed areas corresponding to and matingly engaging the recessed and/or raised regions of the carrier to provide torque transfer capability between the lining and the carrier.

28. The method of claim 27 wherein the carrier is provided only with recessed regions spaced around the circumferential direction of the carrier and each of the new U-shaped friction puck holders is provided on its obverse face only with raised areas corresponding to and matingly engaging the recessed regions of the carrier only when the friction puck holder is correctly positioned on the carrier.

29. The method of claim 27 further including securing the new friction puck holders by rivets located outside of the wear faces of the friction pucks.

* * * * *